United States Patent
Kondou et al.

(12) 
(10) Patent No.: US 6,635,713 B1
(45) Date of Patent: Oct. 21, 2003

(54) RUBBER COMPOSITION, RESIN MODIFIER COMPRISING THE SAME, AND RESIN COMPOSITION

(75) Inventors: Katsuhito Kondou, Kawasaki (JP); Hiroaki Matsuda, Kawasaki (JP); Tetsuya Toyoshima, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/926,652

(22) PCT Filed: May 29, 2000

(86) PCT No.: PCT/JP00/03434

§ 371 (c)(1), (2), (4) Date: Nov. 28, 2001

(87) PCT Pub. No.: WO00/73381

PCT Pub. Date: Dec. 7, 2000

(30) Foreign Application Priority Data

| | | | |
|---|---|---|---|
| May 28, 1999 | (JP) | ............ | 11-150108 |
| May 28, 1999 | (JP) | ............ | 11-150109 |
| Oct. 12, 1999 | (JP) | ............ | 11-290205 |
| Oct. 12, 1999 | (JP) | ............ | 11-290206 |

(51) Int. Cl.$^7$ ............ C08L 9/06; C08L 23/00; C08L 23/04; C08L 101/00

(52) U.S. Cl. ............ 525/191; 525/216; 525/222; 525/232; 525/240

(58) Field of Search ............ 525/191, 216, 525/222, 232, 240

(56) References Cited

U.S. PATENT DOCUMENTS 5,902,856 A * 5/1999 Suzuki et al. ............ 525/237

\* cited by examiner

*Primary Examiner*—Nathan M. Nutter
(74) *Attorney, Agent, or Firm*—Armstrong, Westerman & Hattori, LLP.

(57) ABSTRACT

A rubber composition comprising (A) 2% to 40% by weight of a conjugated diene polymer selected from (A1) a conjugated diene polymer having a vinyl bond content of at least 60% by weight and (A2) a conjugated diene polymer having a vinyl bond content of at least 30% by weight and a coupling ratio of at least 75% by weight, and (B) 98% to 60% by weight of an aromatic vinyl-conjugated diene copolymer having an aromatic vinyl monomer unit content of 25% to 50% by weight is provided, which has well balanced impact resistance and gloss and is less apt to deteriorate in gloss even in a high-temperature environment.

16 Claims, No Drawings

RUBBER COMPOSITION, RESIN MODIFIER COMPRISING THE SAME, AND RESIN COMPOSITION

TECHNICAL FIELD

This invention relates to a rubber composition used as an effective ingredient of a resin modifier, a resin modifier comprising the rubber composition, and a resin composition comprising the resin modifier.

BACKGROUND ART

A high-impact polystyrene resin (HIPS) is a modified resin made by incorporating a rubbery polymer such as a conjugated diene copolymer as a resin modifier in a polystyrene resin. The high-polystyrene resin has good impact resistance, gloss, rigidity and processability and is inexpensive, and thus, is widely used for electrical equipments, office appliances, packaging containers and miscellaneous good.

Among high-impact polystyrene resins, most of those exhibiting a higher impact strength have poor gloss. As a high-impact polystyrene resin having improved gloss, high-impact polystyrene resins having incorporated therein a styrene-butadiene block copolymer as a resin modifier have been proposed, for example, in Japanese Examined Patent Publication No. S48-18594 and ibid. S60-57443. These proposed high-impact polystyrene resins have a problem such that their use is limited because of poor impact resistance.

As methods for improving impact strength without deterioration of gloss, a method of using as a resin modifier a rubber composition comprising polybutadiene having a cis-1,4-bond content of 25 to 40% by weight, and a styrene-butadiene block copolymer, both of which are prepared by polymerization using an organic alkali metal, has been proposed, for example, in Unexamined Japanese Patent Publication No. H2-34611 and ibid. H2-34612. Further, it is taught in these patent publications that, when the polybutadiene is subjected to coupling, impact strength is further improved. However, these high-impact polystyrene resins are still to be poor in impact strength or, when the impact strength is highly improved, they become poor in gloss. Further, a problem arises in that the gloss of high-impact polystyrene resins tends to be reduced in a high-temperature environment.

DISCLOSURE OF THE INVENTION

An object of the present invention is to provide an impact-resistant aromatic vinyl resin composition having well balanced impact resistance and gloss and being less apt to deteriorate in gloss in a high-temperature environment.

Another object of the present invention is to provide a rubber composition used as an effective ingredient in a resin modifier capable of providing the above-mentioned impact-resistant aromatic vinyl resin composition.

The present inventors made extensive research to develop an impact-resistant aromatic vinyl resin composition having well balanced impact resistance and gloss and being less apt to deteriorate in gloss in a high-temperature environment, and found that an impact-resistant aromatic vinyl resin having satisfactory characteristics can be obtained from a rubber composition comprising (A) a specific amount of a conjugated diene polymer selected from (A1) a conjugated diene polymer having a specific vinyl bond content and (A2) a conjugated diene polymer having a specific vinyl bond content in the conjugated diene monomer units and a specific coupling ratio, and (B) an aromatic vinyl-conjugated diene copolymer having a specific aromatic vinyl monomer unit content.

Thus, in one aspect of the present invention, there is provided a rubber composition comprising (A) 2% to 40% by weight of a conjugated diene polymer selected from (A1) a conjugated diene polymer having a vinyl bond content of at least 60% by weight in the conjugated diene monomer units and (A2) a conjugated diene polymer having a vinyl bond content of at least 30% by weight in the conjugated diene monomer units and a coupling ratio of at least 75% by weight, and (B) 98% to 60% by weight of an aromatic vinyl-conjugated diene copolymer having an aromatic vinyl monomer unit content of 25% to 50% by weight.

In another aspect of the present invention, there is provided a resin modifier comprising as an effective ingredient the above-mentioned rubber composition.

In still another aspect of the present invention, there is provided a resin composition comprising the above-mentioned resin modifier.

BEST MODE FOR CARRYING OUT THE INVENTION

Conjugated Diene Polymer (A)

The conjugated diene polymer (A) used in the present invention is selected from (A1) a conjugated diene polymer having a vinyl bond content of at least 60% by weight in the conjugated diene monomer units, and (A2) a conjugated diene polymer having a vinyl bond content of at least 30% by weight in the conjugated diene monomer units and a coupling ratio of at least 75% by weight.

As specific examples of a conjugated diene monomer used for the production of the conjugated diene polymer (A), there can be mentioned 1,3-butadiene, 2-methyl-1,3-butadiene, 2,3-dimethyl-1,3-butadiene, 2-chloro-1,3-butadiene and 1,3-pentadiene. Of these, 1,3-butadiene and 2-methyl-1,3-butadiene are preferable. 1,3-Butadiene is most preferable. These conjugated diene monomers may be used either alone or as a combination of at least two thereof.

The conjugated diene polymer (A) may be a copolymer of a conjugated diene monomer with other copolymerizable monomer. The copolymerizable monomer includes, aromatic vinyl monomers, olefin monomers, non-conjugated diene monomers and acrylic acid ester monomers. Of these, aromatic vinyl monomers are preferable.

As specific examples of the aromatic vinyl monomers, styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is preferable. As specific examples of the olefin monomers, there can be mentioned ethylene, propylene, 1-butene, cyclopentene and 2-norbornene. As specific examples of the non-conjugated diene monomers, there can be mentioned 1,5-hexadiene, 1,6-heptadiene, 1,7-octadiene, dicyclopentadiene and 5-ethylidene-2-norbornene. As specific examples of the acrylic acid ester monomers, there can be mentioned methyl acrylate and methyl methacrylate. These copolymerizable monomers may be used either alone or as a combination of at least two thereof.

The lower limit of the conjugated diene monomer units in the conjugated diene polymer (A) is preferably 55% by weight, and more preferably 75% by weight. If the amount of the conjugated diene monomer units is too small, the resulting resin modifier tends to exhibit reduced resin-modifying effect, i.e., reduced impact strength-improving effect.

The lower limit of the vinyl bond content in the conjugated diene monomer units in the conjugated diene polymer (A1) is 60%, preferably 65% and more preferably 70%. The upper limit thereof is preferably 85% and more preferably 80%. If the vinyl bond content is too small, the resulting resin composition has poor gloss and heat stability of gloss. In contrast, the vinyl bond content is too large, the resulting resin composition tends to exhibit reduced impact strength, especially reduced impact strength at a low temperature. The type of bond in the conjugated diene monomer units is classified into a vinyl bond including a 1,2-vinyl bond unit and 3,4-vinyl bond unit, and a 1,4-bond including 1,4-cis bond unit and 1,4-trans bond.

The lower limit of viscosity of a 5% by weight solution in styrene of the conjugated diene polymer (A1) is preferably 3 cps and more preferably 10 cps. The upper limit thereof is preferably 1,000 cps and more preferably 200 cps. If the solution viscosity is too low, the resulting resin composition tends to have reduced impact strength. In contrast, when the solution viscosity is too high, the resulting resin composition tends to have reduced gloss and heat stability of gloss.

The conjugated diene polymer (A1) may have been subjected to a coupling treatment. In the case of a coupling-treated conjugated diene polymer, the coupling ratio is preferably smaller than 75% by weight and more preferably less than 65% by weight. If the coupling ratio is large, a long time is required for conducting the coupling treatment and the productivity decreases. The coupling ratio of a polymer used herein means a ratio by weight of the coupled polymer molecules to the polymer weight. More specifically the coupling ratio is determined by the peaks detected before and after the coupling treatment by differential refractometer in gel permeation chromatography. The coupling ratio in % is defined as the ratio of the area of peaks as detected after coupling, which have a higher molecular weight than the peak as detected before coupling, to the total area of peaks as detected after coupling.

The process for producing the conjugated diene polymer (A1) is not particularly limited. For example, the polymer (A1) can be produced by polymerizing a conjugated diene monomer alone or in combination with an optional copolymerizable monomer by using an organic active metal compound as an initiator and further using a Lewis base as a randomizer or vinylating agent in a hydrocarbon medium.

The conjugated diene polymer (A2) in the rubber composition of the present invention is a conjugated diene polymer having a vinyl bond content of at least 30% by weight in the conjugated diene monomer units and a coupling ratio of at least 75% by weight.

The lower limit of the vinyl bond content in the conjugated diene monomer units contained in the conjugated diene polymer (A2) is 30%, preferably 60% and more preferably 70%, and the upper limit thereof is preferably 90% and more preferably 80%. When the content of vinyl bond in the conjugated diene monomer units is small, the resulting resin composition has reduced gloss and heat stability of gloss. In contrast, when the vinyl bond content is large, the resulting resin composition tends to have poor impact strength, especially impact strength at a low temperature.

The lower limit of the coupling ratio of the conjugated diene polymer (A2) is 75%, preferably 80% and the upper limit thereof is preferably 90%. When the coupling ratio is small, the resulting resin composition tends to have poor impact strength, especially Du Pont impact strength. In contrast, when the coupling ratio is large, a long time is required for coupling and the productivity decreases.

The lower limit of viscosity of a 5% by weight solution in styrene of the conjugated diene polymer (A2) is preferably 3 cps and more preferably 10 cps. The upper limit thereof is preferably 1,000 cps and more preferably 200 cps. If the solution viscosity is too low, the resulting resin composition tends to have reduced impact strength. In contrast, when the solution viscosity is too high, the resulting resin composition tends to have reduced gloss and heat stability of gloss.

The process for producing the conjugated diene polymer (A2) is not particularly limited. For example, a conjugated diene monomer alone or in combination with an optional copolymerizable monomer is polymerized by using an organic active metal compound as an initiator and further using a vinylating agent in a hydrocarbon medium, and the thus-produced polymer is subjected to a coupling treatment.

When the conjugated diene polymer is produced by polymerization using an organic active metal compound as an initiator, an organic active metal is bonded to a terminal of a conjugated diene polymer chain during polymerization, and thus, a polyfunctional coupling agent is allowed to react with the bonded organic active metal as a reaction site. The coupling treatment is carried out prior to addition of a terminator such as an alcohol, namely, before the polymerization is terminated thereby eliminating the organic active metal from the terminal of polymer chain. The polyfunctional coupling agent used is not particularly limited and includes, for example, halogenated hydrocarbons such as dibromoethane and carbon tetrachloride, halogenated metal compounds such as silicon tetrachloride and tin tetrachloride, and alkoxy metal compounds such as tetramethoxysilane and tetraethoxytin. The lower limit for the coupling treatment is preferably 0° C., more preferably 20° C. and especially preferably 40° C., and the upper limit thereof is preferably 100° C., more preferably 80° C. and especially preferably 70° C.

After the coupling treatment, an alcohol such as methanol or isopropanol is added as a terminator to terminate polymerization. If desired, an antioxidant or an crumb-forming aid is added. Then the polymer solution is heated or subjected to steam stripping to remove the solvent, and then dried to give the conjugated diene polymer (A2).

Aromatic Vinyl-Conjugated Diene Copolymer (B)

The aromatic vinyl-conjugated diene copolymer (B) used in the present invention is a copolymer made from an aromatic vinyl monomer and a conjugated diene monomer, and comprises 25% to 50% by weight, preferably 30% to 40% by weight, of aromatic vinyl monomer units and 75% to 25% by weight, preferably 70% to 60% by weight, of conjugated diene monomer units. When the amount of aromatic vinyl monomer units is small, the resulting resin composition has poor gloss and heat stability of gloss. In contrast, when the amount of aromatic vinyl monomer units is large, the resulting resin composition has reduced impact strength.

As specific examples of the aromatic vinyl monomer and the conjugated diene monomer, there can be mentioned those which are recited hereinbefore as for the conjugated diene rubber (A).

The aromatic vinyl-conjugated diene copolymer (B) may be a copolymer of an aromatic vinyl monomer, a conjugated diene monomer and another monomer copolymerizable therewith, provided that the effect of the present invention can be obtained. The copolymerizable monomer includes, for example, olefin monomers, non-conjugated diene monomers and acrylic acid ester monomers. As specific examples of the copolymerizable monomers, there can be mentioned olefin monomers such as ethylene, propylene, 1-butene, cyclopentene and 2-norbornene; non-conjugated diene monomers such as 1,5-hexadiene, 1,6-heptadiene, 1,7-octadiene, dicyclopentadiene and 5-ethylidene-2-norbornene; and acrylic acid ester monomers such as methyl acrylate and methyl methacrylate. The upper limit of the amount of these copolymerizable monomers is preferably 20% by weight, more preferably 10% by weight and especially preferably 5% by weight.

The amount of vinyl bond in the conjugated diene units in the aromatic vinyl-conjugated diene copolymer (B) is preferably at least 1% by weight and more preferably at least 5% by weight, and preferably smaller than 60% by weight, more preferably smaller than 30% by weight, and especially preferably smaller than 15% by weight. When the amount of vinyl bond is too small or too large, the resulting resin composition has reduced impact strength.

The amount of blocked aromatic vinyl monomer units is preferably at least 50% by weight, more preferably at least 80% by weight and especially preferably at least 90% by weight, based on the total weight of aromatic vinyl monomer units in the copolymer. When the amount of the blocked aromatic vinyl monomer units is small, the resulting resin tends to have poor gloss.

By the term "the content of blocked aromatic vinyl monomer units" used herein we mean the ratio, expressed in % by weight, of the weight of blocked aromatic vinyl monomer units, which is measured by the osmic acid oxidative degradation method, to the total weight of aromatic vinyl monomer units in an aromatic vinyl-conjugated diene copolymer rubber (I. M. Kolthoff et al, J. Polym. Sci., 1, 429 [1948]). When this ratio is larger, the blocks composed only of consecutive aromatic vinyl monomer units are present in a larger proportion.

The viscosity of a 5% by weight solution in styrene of the aromatic vinyl-conjugated diene copolymer (B) is such that the lower limit is preferably 3 cps, more preferably 5 cps and especially preferably 10 cps, and the upper limit is preferably 1,000 cps, more preferably 200 cps and especially preferably 100 cps. If the solution viscosity is too low, the resulting resin composition tends to have reduced impact strength. In contrast, when the solution viscosity is too high, the resulting resin composition tends to have reduced gloss.

The process for producing the aromatic vinyl-conjugated diene copolymer (B) is not particularly limited. For example, a conjugated diene monomer, an aromatic vinyl monomer and an optional copolymerizable monomer are copolymerized by using an organic active metal compound as an initiator and further using a Lewis base as a randomizer or a vinylating agent in a hydrocarbon medium. Preferably, a step of polymerizing alone an aromatic vinyl monomer is provided in the course of the production of the copolymer, thereby producing a block copolymer.

Rubber Composition

The rubber composition of the present invention comprises (A) 2% to 40% by weight, preferably 5% to 30%, of the conjugated diene polymer selected from conjugated diene polymer (A1) and conjugated diene polymer (A2), and (B) 98% to 60% by weight, preferably 95% to 70% by weight, of the aromatic vinyl-conjugated diene copolymer.

If the amount of the conjugated diene polymer (A) is too small, the resultant resin composition has reduced impact resistance. In contrast, if the amount of polymer (A) is too large, the resulting resin composition has poor thermal stability of gloss.

The procedure of producing the above-mentioned rubber composition is not particularly limited. For example, polymers each in a solution form can be mixed together, or polymers each in a coagulated form can be kneaded together. More specifically, in a procedure for mixing together polymers each in a solution form, polymer solutions as-obtained when polymerization is terminated or solutions prepared by dissolving collected polymers in an organic solvent are mixed together and the mixture is made uniform. If desired, an antioxidant and a crumb-forming aid is added to the mixed solution, and then the mixed solution is subjected to steam stripping to remove the solvent, and then dehydrated by a dehydrator or an expansion dryer, to give a rubber composition. In a procedure for mixing together by kneading the polymers, coagulated polymers, i.e., crumbs obtained by subjecting polymer solutions as-obtained upon completion of polymerization to a steam-stripping treatment, and collecting the treated polymers, or dried crumbs prepared by drying the crumbs, or powders or baled mass, are mechanically kneaded together and, if desired, dried to give a rubber composition.

Resin Modifier

A resin modifier of the present invention comprises as an effective ingredient the above-mentioned rubber composition, and is useful especially as a modifier for improving impact resistance, i.e., enhancing impact strength, of a resin, namely, as a toughening agent. Usually, the conjugated diene polymer (A) and the aromatic vinyl-conjugated diene copolymer (B) are mixed together and then incorporated in a resin. If desired, the polymer (A) and the copolymer (B) are separately incorporated in a resin and then mixed uniformly together with the resin. Rubbers other than the polymer (A) and the copolymer (B), and other ingredients can be contained in the resin modifier, provided that the effect of the present invention is obtained.

The rubber which can be used in combination with the conjugated diene polymer (A) and the aromatic vinyl-conjugated diene copolymer (B) is not particularly limited, and includes, for example, conjugated diene polymers other than the conjugated diene polymer (A), and aromatic vinyl-conjugated diene copolymers other than the aromatic vinyl-conjugated diene copolymer (B).

According to the need, ingredients conventionally used in the resin industry can be incorporated in the resin modifier of the present invention. As specific examples of the ingredients, there can be mentioned mineral oil and fluid paraffin. If a monomer for a resin is polymerized in the presence of the resin modifier to produce a resin composition, ingredients used should preferably chosen from those which do not give a baneful influence to the polymerization reaction, nor deteriorate the properties of the resulting resin composition.

Resin Composition

A resin composition of the present comprises the above-mentioned resin modifier. The resin is not particularly limited, but, is preferably a thermoplastic resin. The thermoplastic resin includes, for example, an aromatic vinyl resin, an olefin resin and engineering plastics. Of these, an aromatic vinyl resin is preferable. As specific examples of the aromatic vinyl resin, there can be mentioned an acrylonitrile-acrylate-styrene resin, an acrylonitrile-ethylene-styrene resin, an acrylonitrile-styrene resin, an acrylonitrile-butadiene-styrene resin, a polystyrene resin, a high-impact polystyrene resin and a methyl methacrylate-styrene resin. As specific examples of the olefin resin, there can be mentioned polyethylene and polypropylene. As specific examples of the engineering plastics, there can be mentioned polyphenylene ether, polyamide, poycarbonate, polyacetal and polyester. These resins may be used either alone or as a combination of at least two thereof. Among the resins, a polystyrene resin is most preferably used.

The ratio of the above-mentioned rubber composition to a resin is appropriately varied depending upon the particular object and the kind and composition of the rubber. However, the amount of the rubber composition to be incorporated in 100 parts by weight of a resin is such that the lower limit is preferably 2 parts by weight, more preferably 3 parts by weight and especially preferably 5 parts by weight, and the upper limit is preferably 30 parts by weight, more preferably 20 parts by weight and especially preferably 15 parts by weight. When the amount of the rubber composition is small, the effect of modifying impact resistance is minor. In contrast, when the amount of the rubber composition is large, resulting resin composition has a reduced gloss.

According to the need, ingredients conventionally used in the resin industry can be incorporated in the resin composition of the present invention. As specific examples of the ingredients, there can be mentioned mineral oil and fluid paraffin, as mentioned above for the rubber composition, and organic and inorganic fillers, stabilizers, plasticizers, lubricants, ultraviolet absorbers, colorants, releasers, antistatic agents and flame-retardants. These ingredients may be used either alone or as a combination of at least two thereof. The amount of the ingredients is appropriately provided that the object of the present invention is achieved.

The resin composition of the present invention has a melt flow rate as measured at 200° C. and a load of 5 kg according to JIS K6871 such that the lower limit is preferably 0.1 and more preferably 0.5, and the upper limit is preferably 20. When the melt flow rate is too small or too large, the kneading is difficult and the dispersion of rubber becomes non-uniform, with the result of non-uniform quality of resin composition and reduction of impact resistance improving effect.

The resin composition of the present invention can be made by mixing together the resin modifier and a resin, or by polymerizing a monomer for a resin in the presence of the resin modifier.

The mixing of the resin modifier with a resin can be by a conventional procedure, for example, by a single-screw or twin-screen extruder, a Banbury mixer, a roll or a kneader. The mixing temperature is usually in the range of 100 to 250° C.

In the case where a monomer for resin is polymerized in the presence of the resin modifier, the resin modifier is dissolved or dispersed in the monomer for resin to prepare a monomer solution or dispersion, followed by polymerization in a reactor.

The invention will now be more specifically described by the following production examples, examples and comparative examples. In these examples, parts and % are by weight unless otherwise specified. Various properties were determined by the following methods.

(1) The content of vinyl bond in the conjugated diene monomer units of a conjugated diene polymer was determined by infrared spectrophotometry wherein calculation was made according to the Morero method described in D. Morero et al., Chimie Ind., 41, 758 (1959).

(2) Coupling ratio was determined from a chart of gel permeation chromatography measured by using high-speed liquid chromatography apparatus (tradename "HLC-8020" available from Tosoh Corporation, with a column G4000HXL available from Tosoh Corporation connected to a column G5000HXL available from Tosoh Corporation).

(3) The content of aromatic vinyl monomer units in an aromatic vinyl-conjugated diene copolymer rubber, and the content of vinyl bond in the conjugated diene monomer units of an aromatic vinyl-conjugated diene copolymer rubber were determined by a measurement using infrared spectrophotometry according to the Hampton method (R. Hampton, Anal. Chem. 21, 923 (1949) and calculation from a calibration curve.

(4) The content of blocked aromatic vinyl monomer units in an aromatic vinyl-conjugated diene copolymer rubber was measured by the osmic acid oxidative degradation method. More specifically, 0.05 g of an aromatic vinyl-conjugated diene copolymer rubber was dissolved in 10 ml of carbon tetrachloride to prepare a copolymer rubber solution. 16 ml of an aqueous 70% solution of tert.-butyl hydroperoxide and 4 ml of a 0.05% solution of osmium tetraoxide in chloroform were added to the copolymer rubber solution. The mixture was refluxed in a bath maintained at 90° C. for 15 minutes whereby the copolymer rubber was subjected to an oxidative degradation reaction. After completion of the reaction, the reaction liquid was cooled and then 200 ml of methanol was added to the reaction liquid while being stirred, thereby precipitating a blocked aromatic vinyl ingredient. The precipitate-containing liquid was filtered by a glass filter having an average pore size of 5 $\mu$m. The thus-collected solid was weighed. The content of blocked aromatic vinyl monomer units was expressed by the ratio of the weight of the collected solid to the total weight of aromatic vinyl monomer units of the aromatic vinyl-conjugated diene copolymer rubber.

(5) Izod impact strength was determined as follows. A pellet of a resin composition was injection molded by using an injection molding machine "SAV-30/30" (available from Yamashiro Seiki K.K., mold temperature: 50° C. nozzle tip temperature: 240° C.) to prepare a specimen. The measurement of Izod impact strength was conducted at 25° C. according to JIS K-7110. The Izod impact strength was expressed in terms of an index with the value obtained in Comparative Example 1 being 100. When the index value is larger than 100, the impact strength is acceptable.

(6) Gloss was evaluated as follows. A pellet of a resin composition was injection molded by using an injection molding machine "SAV-30/30" (available from Yamashiro Seiki K.K., mold temperature: 50° C., nozzle tip temperature: 240° C.) to prepare a specimen. The measurement of gloss was conducted at an incident angle of 60° according to JIS Z-8741. The gloss was expressed in terms of an index with the gloss value obtained in Comparative Example 1 in the tests shown in Table 3 being 100 and with the gloss value obtained in Comparative Example 5 in the tests shown in Table 5 being 100. The larger the index, the more excellent the gloss.

(7) Heat stability of gloss was evaluated as follows. Gloss of a specimen was measured according to JIS Z-8741 before and after it was heat-treated, and the ratio in percent of the value obtained by measurement after heat-treatment to the value obtained by measurement before heat-treatment was calculated. The heat stability of gloss was expressed by assigning the following ratings.

Rating
A: the ratio is at least 97%
B: the ratio is at least 96%, but smaller than 97%
C: the ratio is at least 95%, but smaller than 96%
D: the ratio is smaller than 95%

(8) Du Pont impact strength was measured as follows. A pellet of a resin composition was injection molded by using an injection molding machine "SAV-30/30" (available from Yamashiro Seiki K.K., mold temperature: 50° C., nozzle tip temperature: 240° C.) to prepare a specimen having a size of 40 mm×70 mm×2 mm. The measurement of Du Pont impact strength was carried out according to ASTM D3029, Method F, Geometry FB. The Du Pont impact strength was expressed in terms of an index with the impact strength value obtained in Comparative Example 5 being 100. The larger the index value, the more excellent the impact strength.

PRODUCTION EXAMPLE 1

A reactor quipped with a stirrer, a reflux condenser and a jacket was washed and dried, and the inner atmosphere was replaced with nitrogen gas. Then the reactor was charged with 700 kg of previously purified and dried cyclohexane, 640 milli-mol of N,N,N',N'-tetramethylethylenediamine (TMEDA) and 60 kg of 1,3-butadiene, and the temperature of the content was elevated to 50° C. Then 450 ml of a solution of 1.65 milli-mol/ml of n-butyl lithium in hexane was added to initiate polymerization. From the commencement of polymerization, the polymerization temperature was elevated to 60° C. at a rate of 0.5° C./min. When the polymerization conversion reached about 100%, 40 kg of 1,3-butadiene was added and polymerization was continued. When the polymerization conversion reached about 100%, 1 mol of isopropyl alcohol was added to terminate polymerization. Then 200 g of a phenolic antioxidant ("Irganox 1076" available from Ciba-Geigy A.G.) was added to the polymerization mixture. 10 kg of the polymerization mixture was taken out, and a part thereof was subjected to steam stripping to remove the solvent, and then vacuum dried to give a conjugated diene polymer i. The content of vinyl bond in conjugated diene polymer i, the coupling ratio thereof and the viscosity of a 5% solution thereof in styrene are shown in Table 1.

PRODUCTION EXAMPLE 2

By the same procedures as described in Production Example 1, a conjugated diene polymer ii was produced wherein, when the polymerization conversion of the additional 1,3-butadiene reached about 100%, 74 milli-mol of tetramethoxysilane was added to initiate a coupling reaction, and the coupling reaction was continued for 120 minutes with all other conditions remaining the same. Evaluation results of conjugated diene polymer ii are shown in Table 1.

PRODUCTION EXAMPLE 3

By the same procedures as described in Production Example 1, a conjugated diene polymer iii was produced wherein the amount of TMEDA was changed to 1,000 milli-mol with all other conditions remaining the same. Evaluation results of conjugated diene polymer iii are shown in Table 1.

PRODUCTION EXAMPLE 4

By the same procedures as described in Production Example 1, a conjugated diene polymer iv was produced wherein the amount of TMEDA was changed to 1,000 milli-mol; and, when the polymerization conversion of the additional 1,3-butadiene reached about 100%, 27 milli-mol of tetramethoxysilane was added to initiate a coupling reaction and the coupling reaction was continued for 120 minutes with all other conditions remaining the same. Evaluation results of conjugated diene polymer iv are shown in Table 1.

PRODUCTION EXAMPLE 5

By the same procedures as described in Production Example 1, a conjugated diene polymer v was produced wherein the amount of TMEDA was changed to 1,340 milli-mol; the amount of the solution of 1.65 milli-mol/ml of n-butyl lithium in hexane was changed to 550 ml; and, when the polymerization conversion of the additional 1,3-butadiene reached about 100%, 101 milli-mol of tetramethoxysilane was added to initiate a coupling reaction and the coupling reaction was continued for 120 minutes with all other conditions remaining the same. Evaluation results of conjugated diene polymer v are shown in Table 1.

PRODUCTION EXAMPLE 6

By the same procedures as described in Production Example 1, a conjugated diene polymer vi was produced wherein the amount of TMEDA was changed to 183 milli-mol; and, when the polymerization conversion of the additional 1,3-butadiene reached about 100%, 480 milli-mol of tetramethoxysilane was added to initiate a coupling reaction and the coupling reaction was continued for 120 minutes with all other conditions remaining the same. Evaluation results of conjugated diene polymer vi are shown in Table 1.

TABLE 1

| Conjugated diene polymer | i | ii | iii | iv | v | vi |
| --- | --- | --- | --- | --- | --- | --- |
| Vinyl bond content (%) | 64 | 64 | 74 | 74 | 78 | 21 |
| Coupling ratio (%) | — | 63 | — | 20 | 62 | 67 |
| Viscosity of 5% solution in styrene (cps) | 39 | 98 | 37 | 56 | 60 | 30 |

PRODUCTION EXAMPLE 7

A reactor quipped with a stirrer, a reflux condenser and a jacket was washed and dried, and the inner atmosphere was replaced with nitrogen gas. Then the reactor was charged with 700 kg of previously purified and dried cyclohexane and 60 kg of 1,3-butadiene, and the temperature of the content was elevated to 50° C. Then 500 ml of a solution of 1.65 milli-mol/ml of n-butyl lithium in hexane was added to initiate polymerization. From the commencement of polymerization, the polymerization temperature was elevated to 70° C. at a rate of 1° C./min. When the polymerization conversion reached 100%, 40 kg of styrene was added and polymerization was continued. When the polymerization conversion of the additional styrene reached about 100%, 1 mol of isopropyl alcohol was added to terminate polymerization. Then 200 g of a phenolic antioxidant ("Irganox 1076" available from Ciba-Geigy A.G.) was added to the polymerization mixture. 10 kg of the polymerization mixture was taken out, and a part thereof was subjected to steam stripping to remove the solvent, and then vacuum dried to give an aromatic vinyl-conjugated diene copolymer I. The content of aromatic vinyl monomer units in aromatic vinyl-conjugated diene copolymer I, the content of blocked aromatic vinyl monomer units in the copolymer I, the content of vinyl bond in the copolymer I, and the viscosity of a 5% solution thereof in styrene are shown in Table 2.

PRODUCTION EXAMPLE 8

By the same procedures as described in Production Example 7, an aromatic vinyl-conjugated diene copolymer II was produced wherein the amount of the solution of n-butyl lithium in hexane was changed to 450 ml with all other conditions remaining the same. Evaluation results of the copolymer II are shown in Table 2.

PRODUCTION EXAMPLE 9

By the same procedures as described in Production Example 7, polymerization was initiated wherein the amount of 1,3-butadiene was changed to 62 kg and the amount of the solution of n-butyl lithium in hexane was changed to 450 ml with all other conditions remaining the same. When the polymerization conversion reached about 100%, 18 kg of styrene and 20 kg of butadiene were added and polymerization was continued. When the polymerization conversion of the additional monomers reached about 100%, 20 of styrene was further added and polymerization was continued. When the polymerization conversion of the second additional styrene reached about 100%, the procedures described in Production Example 7 were repeated to obtain an aromatic vinyl-conjugated diene copolymer III. Evaluation results of the copolymer III are shown in Table 2.

TABLE 2

| Aromatic vinyl-conjugated diene copolymer | I | II | III |
| --- | --- | --- | --- |
| Content of aromatic vinyl monomer units (%) | 40 | 40 | 40 |
| Content of blocked aromatic vinyl monomer units (%) | 97 | 98 | 85 |
| Vinyl bond content (%) | 8 | 8 | 8 |
| Viscosity of 5% styrene solution in styrene (cps) | 21 | 30 | 33 |

EXAMPLE 1

The solution of conjugated diene polymer i as obtained by termination of polymerization in Production Example 1 and the solution of aromatic vinyl-conjugated diene copolymer II as obtained by termination of polymerization in Production Example 8 were mixed together at a polymer i/copolymer II ratio of 10/90 by weight and made uniform. Then 0.2 parts of a phenolic antioxidant ("Irganox 1076") was added based on 100 parts by weight of the rubber ingredients. The resultant rubber composition solution was subjected to steam stripping to remove the solvent, and then dehydrated by using a dehydrator and an expansion dryer to give a rubber composition A.

10 parts of rubber composition A was dissolved in 90 parts of a styrene monomer, and a chain transfer agent (n-dodecyl mercaptan) was added in an amount of 300 ppm to obtain a monomer solution. The monomer solution was continuously fed into a stainless steel reactor equipped with a stirrer. The polymerization temperature and the flow rate of the fed monomer solution were controlled so that the solid concentration of the solution at an outlet of the reactor was 30%. The solution flowing from the reactor was collected, and then charged in a stainless steel reactor equipped with a stirrer. Polymerization was carried out until the solid concentration reached 45% at 130° C. The content was cooled and then taken out from the reactor.

A stainless steel reactor equipped with a stirrer was charged with 625 parts of the obtained content and 1,825 parts of an aqueous solution of polyvinyl alcohol ("Gosenol GH-20" available from The Nippon Synthetic Chem. Co.) as a dispersant. The content was heated to 70° C. while being stirred. Then, 1.25 parts of benzoyl peroxide and 0.63 part of dicumyl peroxide were added as a radical polymerization initiator to initiate a suspension polymerization. The suspension polymerization was carried out at 70° C. for 1 hour, at 90° C. for 1 hour, at 110° C. for 1 hour, and further at 130° C. for 4 hour. After termination of polymerization, the polymerization mixture was filtered to collect a polymer composition. The polymer composition was washed with water, dehydrated, and then dried in vacuum at 60° C. for 120 hours to give a polystyrene resin composition SA.

Polystyrene resin composition SA was kneaded by rolls at 180° C. and shaped into a sheet. The sheet was pelletized into a pellet by a sheet-pelletizer. Using the pellet as a test sample, Izod impact strength, gloss and heat stability of gloss were evaluated. The results are shown in Table 3.

A rubber composition B was prepared by the same procedures as described in Example 1 wherein the solution of conjugated diene polymer ii as obtained by termination of polymerization in Production Example 2 was used instead of the solution of conjugated diene polymer i, and a polystyrene resin composition SB was prepared by the same procedures as described in Example 1 wherein rubber composition B was used instead of rubber composition A. All other conditions remained the same. The properties of polystyrene resin composition SB were evaluated. The results are shown in Table 3.

EXAMPLE 3

A rubber composition C was prepared by the same procedures as descried in Example 1 wherein the solution of conjugated diene polymer iii as obtained by termination of polymerization in Production Example 3 was used instead of the solution of conjugated diene polymer i, the solution of aromatic vinyl-conjugated diene copolymer III as obtained by termination of polymerization in Production Example 9 was used instead of the solution of aromatic vinyl-conjugated diene copolymer II, and the two polymers were mixed together at a polymer iii/copolymer III ratio of 10/90 by eight with all other conditions remaining the same. Further, a polystyrene resin composition SC was prepared by the same procedures are described in Example 1 wherein rubber composition C was used instead of rubber composition A with all other conditions remaining the same. The properties of polystyrene resin composition BC were evaluated. The results are shown in Table 3.

EXAMPLE 4

5 parts of dried conjugated diene polymer iv and 95 parts of dried aromatic vinyl-conjugated diene copolymer II were kneaded together by rolls to prepare a rubber composition D. A polystrene resin composition SD was prepared by the same procedures as described in Example 1 wherein rubber composition D was used instead of rubber composition A with all other conditions remaining the same. The properties of polystrene resin composition SD were evaluated. The results are shown in Table 3.

EXAMPLE 5

30 parts of dried conjugated diene polymer V and 70 parts of dried aromatic vinyl-conjugated diene copolymer I were kneaded together by rolls to prepare a rubber composition E. A polystyrene resin composition SE was prepared by the same procedures as described in Example 1 wherein rubber composition E was used instead of rubber composition A with all other conditions remaining the same. The properties of polystyrene resin composition SE were evaluated. The results are shown in Table 3.

EXAMPLE 6

1 part of dried conjugated diene polymer V and 9 parts of dried aromatic vinyl-conjugated diene copolymer III were dissolved in 90 parts of a styrene monomer. A chain transfer agent (n-dodecyl mercaptan) was added to the obtained solution to prepare a monomer solution containing 300 ppm of the chain transfer agent. By the same procedures as described in Example 1, a polystyrene resin composition SF was prepared wherein the above-mentioned monomer solution was used instead of the solution of rubber composition A in styrene with all other conditions remaining the same. The properties of polystrene resin composition SF were evaluated. The results are shown in Table 3.

COMPARATIVE EXAMPLE 1

By the same procedures as described in Example 1, a polystyrene resin composition SG was prepared wherein aromatic vinyl-conjugated diene copolymer II was used instead of rubber composition A with all other conditions remaining the same. The properties of polystyrene resin composition SG were evaluated. The results are shown in Table 3.

Polystyrene resin composition SG in this Comparative Example 1 does not contain conjugated diene polymer (Al). Therefore, although polystyrene resin composition SG exhibits excellent heat stability of gloss, it has poor gloss and poor impact strength.

COMPARATIVE EXAMPLE 2

A rubber composition H was prepared by the same procedures as described in Example 1 wherein the solution of conjugated diene polymer V as obtained by termination of polymerization in Production Example 5 was used, the solution of aromatic vinyl-conjugated diene copolymer III as obtained by termination of polymerization in Production Example 9 was used, and the two polymers were mixed together at a polymer V/copolymer III ratio of 50/50 by weight with all other conditions remaining the same. Further, a polystrene resin composition SH was prepared by the same procedures as described in Example 1 wherein rubber composition H was used instead of rubber composition A with all other conditions remaining the same. The properties of polystyrene resin composition SH were evaluated. The results are shown in Table 3.

Polystrene resin composition SH, prepared from rubber composition H containing a large amount of a conjugated diene polymer (Al), has excellent impact strength but poor gloss and heat stability of gloss.

COMPARATIVE EXAMPLE 3

A rubber composition J was prepared by the same procedures as described in Example 1 wherein the solution of conjugated diene polymer vi as obtained by termination of polymerization in Production Example 6 was used instead of the solution of conjugated diene polymer i. A polystrene resin composition SJ was prepared by the same procedures as described in Example 1 wherein rubber composition J was used instead of rubber composition A. All other conditions remained the same. The properties of polystyrene resin composition SJ were evaluated. The results are shown in Table 3.

Polystyrene resin composition SJ was prepared from rubber composition J containing a conjugated diene polymer having a low vinyl bond content, and therefore, the composition SJ has poor gloss and heat stability of gloss.

COMPARATIVE EXAMPLE 4

A polystrene resin composition SK was prepared by the same procedures as described in Example 1 wherein the monomer solution used was prepared as follows. 13 parts of conjugated diene polymer V and 7 parts of aromatic vinyl-conjugated diene copolymer II were dissolved in 90 parts of a styrene monomer. A chain transfer agent (n-dodecyl mercaptan) was added to the obtained solution to prepare a monomer solution containing 300 ppm of the chain transfer agent. All other conditions remaining the same. The properties of polystyrene resin composition SK were evaluated. The results are shown in Table 3.

Polystyrene resin composition SK in this Comparative Example 4 was prepared from rubber composition K containing a conjugated diene polymer having a low vinyl bond content, and therefore, the composition SK has poor gloss and heat stability of gloss.

As seen from the above working examples, the polystyrene resin composition of the present invention has well balanced impact resistance and gloss, and exhibits excellent heat stability of gloss.

TABLE 3

|  | Examples | | | | | | Comparative Examples | | | |
| --- | --- | --- | --- | --- | --- | --- | --- | --- | --- | --- |
|  | 1 | 2 | 3 | 4 | 5 | 6 | 1 | 2 | 3 | 4 |
| Conjugated diene polymer | i | ii | iii | iv | iv | v | — | v | vi | vi |
| Aromatic vinyl-conjugated diene copolymer | II | II | III | II | I | III | II | III | II | II |
| Rubber composition | A | B | C | D | E | — | — | H | J | — |
| Polystyrene resin composition | SA | SB | SC | SD | SE | SF | SG | SH | SJ | SK |
| Melt flow rate | 2.9 | 2.9 | 3.0 | 3.0 | 2.9 | 2.9 | 2.8 | 2.7 | 2.9 | 2.7 |
| Izod impact strength (kg.cm/cm) | 4.3 | 4.5 | 4.3 | 4.7 | 4.9 | 4.6 | 4.0 | 4.8 | 3.9 | 4.2 |
| Izod impact strength index | 108 | 113 | 108 | 118 | 123 | 108 | 100 | 120 | 103 | 105 |
| Luster | 93 | 92 | 94 | 95 | 90 | 90 | 85 | 68 | 84 | 82 |
| Luster index | 109 | 108 | 111 | 112 | 106 | 106 | 100 | 80 | 99 | 97 |
| Luster as measured after heat-treatment (%) | 97 | 97 | 97 | 98 | 96 | 97 | 97 | 94 | 95 | 94 |
| Thermal stability of luster | A | A | A | A | B | A | A | D | C | D |

PRODUCTION EXAMPLE 10

By the same procedures as described in Production Example 2, a conjugated diene polymer vii was produced wherein the amount of N,N,N',N'-teteramethylethylenediamine (TMEDA) was changed to 1,000 milli-liter and the amount of tetramethoxysilane was changed to 129 milli-mol with all other conditions remaining the same. Evaluation results of conjugated diene polymer vii are shown in Table 4.

PRODUCTION EXAMPLE 11

By the same procedures as described in Production Example 10, a conjugated diene polymer vii was produced wherein the amount of TMEDA was changed to 640 milliliter with all other conditions remaining the same. Evaluation results of conjugated diene polymer viii are shown in Table 4.

PRODUCTION EXAMPLE 12

By the same procedures as described in Production Example 10, a conjugated diene polymer ix was produced wherein the amount of the solution of 1.65 milli-mol/ml of n-butyl lithium in hexane was changed to 650 ml, the amount of TMEDA was changed to 250 milli-mol and the amount of tetramethyoxysilane was changed to 183 milli-mol with all other conditions remaining the same. Evaluation results of conjugated diene polymer ix are shown in Table 4.

PRODUCTION EXAMPLE 13

By the same procedures as described in Production Example 10, a conjugated diene polymer x was produced wherein the amount of the solution of 1.65 milli-mol/ml of n-butyl lithium in hexane was changed to 900 ml, the amount of TMEDA was changed to 2,500 milli-mol and the amount of tetramethoxysilane was changed to 46 milli-mol with all other conditions remaining the same. Evaluation results of conjugated diene polymer x are shown in Table 4.

PRODUCTION EXAMPLE 14

By the same procedures as described in Production Example 10, a conjugated diene polymer xi was produced wherein the amount of the solution of 1.65 milli-mol/ml of n-butyl lithium in hexane was changed to 1,150 ml, the amount of TMEDA was changed to 183 milli-mol and the amount of tetramethoxysilane was changed to 70 milli-mol with all other conditions remaining the same. Evaluation results of conjugated diene polymer xi are shown in Table 4.

TABLE 4

| Conjugated diene polymer | vii | viii | ix | x | xi |
|---|---|---|---|---|---|
| Vinyl bond content (%) | 74 | 64 | 43 | 75 | 21 |
| Coupling ratio (%) | 76 | 77 | 82 | 83 | 67 |
| Viscosity of 5% solution in styrene (cps) | 125 | 130 | 63 | 33 | 30 |

EXAMPLE 7

The solution of conjugated diene polymer vii as obtained by termination of polymerization in Production Example 10 and the solution of aromatic vinyl-conjugated diene copolymer II as obtained by termination of polymerization in Production Example 8 were mixed together at a polymer vii/copolymer II ratio of 10/90 by weight and made uniform to prepare a rubber composition solution. Then 0.2 parts of a phenolic antioxidant ("Irganox 1076") was added based on 100 parts by weight of the total rubber ingredients. The resultant rubber composition solution was subjected to steam stripping to remove the solvent, and then dehydrated by using a dehydrator and an expansion dryer to give a rubber composition L.

10 parts of rubber composition L was dissolved in 90 parts of a styrene monomer, and a chain transfer agent (n-dodecyl mercaptan) was added to prepare a monomer solution containing 300 ppm of the chain transfer agent. The monomer solution was continuously fed into a stainless steel reactor equipped with a stirrer. The polymerization temperature and the flow rate of the fed monomer solution were controlled so that the solid concentration of the solution at an outlet of the reactor was 30%. 2.300 parts of the solution flowing from the reactor was collected, and then charged in a stainless steel reactor equipped with a stirrer. Polymerization was carried out until the solid concentration reached about 40% at 130° C. The content was cooled and then taken out from the reactor.

A stainless steel reactor equipped with a stirrer was charged with 625 parts of the obtained content and 1,825 parts of an aqueous solution of polyvinyl alcohol ("Gosenol GH-20" available from The Nippon Synthetic Chem. Co.) as a dispersant. The content was heated to 70° C. while being stirred. Then, 1.25 parts of benzoyl peroxide and 0.63 part of dicumyl peroxide were added as a radical polymerization initiator to initiate a suspension polymerization. The suspension polymerization was carried out at 70° C. for 1 hour, at 90° C. for 1 hour, at 110° C. for 1 hour, and further at 130° C. for 4 hour. After termination of polymerization, the polymerization mixture was filtered to collect a polymer composition. The polymer composition was washed with water, dehydrated, and then dried in vacuum at 60° C. for 12 hours to give a polystyrene resin composition SL.

Polystyrene resin composition SL was kneaded by rolls at 180° C. and shaped into a sheet. The sheet was pelletized into a pellet by a sheet-pelletizer. Using the pellet as a test sample, Du Pont impact strength, gloss and heat stability of gloss were evaluated. The results are shown in Table 5.

EXAMPLE 8

A rubber composition M was prepared by the same procedures as described in Example 7 wherein the solution of conjugated diene polymer viii as obtained by termination of polymerization in Production Example 11 was used instead of the solution of conjugated diene polymer vii, and a polystyrene resin composition SM was prepared by the same procedure as described in Example 7 wherein rubber composition M was used instead of rubber composition L. All other conditions remained the same. The properties of polystyrene resin composition SM were evaluated. The results are shown in Table 5.

EXAMPLE 9

A rubber composition N was prepared by the same procedures as described in Example 7 wherein the solution of conjugated diene polymer ix as obtained by termination of polymerization in Production Example 12 was used instead of the solution of conjugated diene polymer vii; and conjugated diene polymer ix and aromatic vinyl-conjugated diene copolymer II were mixed together at a polymer ix/copolymer II ratio of 25/75 by weight. Further, a polystyrene resin composition SN was prepared by the same procedures as described in Example 7 wherein rubber composition N was used instead of rubber composition L. All other conditions remained the same. The properties of polystyrene resin composition SN were evaluated. The results are shown in Table 5.

EXAMPLE 10

A rubber composition P was prepared by the same procedures as described in Example 7 wherein the solution of conjugated diene polymer x as obtained by termination of polymerization in Production Example 13 was used instead of the solution of conjugated diene polymer vii. Further, a polystyrene resin composition SP was prepared by the same procedures as described in Example 7 wherein rubber composition P was used instead of rubber composition L. All other conditions remained the same. The properties of polystyrene resin composition SP were evaluated. The results are shown in Table 5.

EXAMPLE 11

A rubber composition Q was prepared by the same procedures as described in Example 10 wherein the ratio of conjugated diene polymer X to aromatic vinyl-conjugated diene copolymer II was changed to 5/95 by weight. Further, a polystyrene resin composition SQ was prepared by the same procedures as described in Example 7 wherein rubber composition Q was used instead of rubber composition L. All other conditions remained the same. The properties of polystyrene resin composition SQ were evaluated. The results are shown in Table 5.

EXAMPLE 12

A rubber composition R was prepared by the same procedures as described in Example 10 wherein the solution of aromatic vinyl-conjugated diene copolymer I as obtained by termination of polymerization in Production Example 7 was used instead of the solution of aromatic vinyl-conjugated diene copolymer II, and the ratio of conjugated diene polymer X to aromatic vinyl-conjugated diene copolymer I was changed to 30/70 by weight. Further, a polystyrene resin composition SR was prepared by the same procedures as described in Example 7 wherein rubber composition R was used instead of rubber composition L. All other conditions remained the same. The properties of polystyrene resin composition SR were evaluated. The results are shown in Table 5.

EXAMPLE 13

A rubber composition S was prepared by the same procedures as described in Example 10 wherein the solution of aromatic vinyl-conjugated diene copolymer III as obtained by termination of polymerization in Production Example 9 was used instead of the solution of aromatic vinyl-conjugated diene copolymer II, and the ratio of conjugated diene polymer X to aromatic vinyl-conjugated diene copolymer III was changed to 10/90 by weight. Further, a polystyrene resin composition SS was prepared by the same procedures as described in Example 7 wherein rubber composition S was used instead of rubber composition L. All other conditions remained the same. The properties of polystyrene resin composition SS were evaluated. The results are shown in Table 5.

COMPARATIVE EXAMPLE 5

By the same procedures as described in Example 7, a polystyrene resin composition ST was prepared wherein dried aromatic vinyl-conjugated diene polymer II was used instead of rubber composition L with all other conditions remaining the same. The properties of polystyrene resin composition ST were evaluated. The results are shown in Table 5.

Polystyrene resin composition ST in this Comparative Example 5 does not contain conjugated diene polymer (A2). Therefore, although polystyrene resin composition ST exhibits excellent heat stability of gloss, it has poor gloss and poor impact strength.

COMPARATIVE EXAMPLE 6

A rubber composition U was prepared by the same procedures as described in Example 12 wherein the ratio of conjugated diene polymer X to aromatic vinyl-conjugated diene copolymer I was changed to 50/50 by weight. Further, a polystyrene resin composition SU was prepared by the same procedures as described in Example 7 wherein rubber composition U was used instead of rubber composition L. All other conditions remained the same. The properties of polystyrene resin composition SU were evaluated. The results are shown in Table 5.

Polystyrene resin composition SU in this Comparative Example 6 is prepared from rubber composition U containing a large amount of a conjugated diene polymer (A2), and has excellent impact strength but poor gloss.

COMPARATIVE EXAMPLE 7

A rubber composition V was prepared by the same procedures as described in Example 7 wherein the solution of conjugated diene polymer xi as obtained by termination of polymerization in Production Example 14 and the solution of aromatic vinyl-conjugated diene copolymer II as obtained by termination of polymerization in Production Example 8 were used, and the ratio of conjugated diene polymer xi to aromatic vinyl-conjugated diene copolymer II was changed to 30/70 by weight. Further, a polystyrene resin composition SV was prepared by the same procedures as described in Example 7 wherein rubber composition V was used instead of rubber composition L. All other conditions remained the same. The properties of polystyrene resin composition SV were evaluated. The results are shown in Table 5.

TABLE 5

|  | Examples | | | | | | | Comp. Ex. | | |
| --- | --- | --- | --- | --- | --- | --- | --- | --- | --- | --- |
|  | 7 | 8 | 9 | 10 | 11 | 12 | 13 | 5 | 6 | 7 |
| Conjugated diene polymer | vii | viii | ix | x | x | x | x | — | x | xi |
| Aromatic vinyl-conjugated diene copolymer | II | II | II | II | II | I | III | II | I | II |
| Rubber composition | L | M | N | P | Q | R | S | — | U | V |
| Polystyrene resin composition | SL | SM | SN | SP | SQ | SR | SS | ST | SU | SV |
| Melt flow rate | 2.9 | 2.9 | 2.8 | 2.9 | 2.9 | 2.8 | 2.9 | 3.0 | 2.8 | 2.9 |
| Du Pont impact strength (kg.cm/cm) | 1.8 | 1.9 | 1.0 | 1.7 | 1.0 | 2.3 | 1.2 | 0.6 | 2.4 | 2.1 |
| Du Pont impact strength index | 300 | 317 | 167 | 283 | 167 | 383 | 200 | 100 | 400 | 350 |
| Luster | 86 | 87 | 85 | 87 | 95 | 85 | 90 | 85 | 44 | 65 |

TABLE 5-continued

|  | Examples | | | | | | | Comp. Ex. | | |
| --- | --- | --- | --- | --- | --- | --- | --- | --- | --- | --- |
|  | 7 | 8 | 9 | 10 | 11 | 12 | 13 | 5 | 6 | 7 |
| Luster index | 101 | 102 | 100 | 102 | 118 | 100 | 106 | 100 | 52 | 76 |
| Luster as measured after heat-treatment (%) | 97 | 97 | 96 | 97 | 98 | 96 | 97 | 97 | 96 | 92 |
| Thermal stability of luster | A | A | B | A | A | B | A | A | B | D |

Polystyrene resin composition SV in this Comparative Example 7 was prepared from rubber composition V containing a conjugated diene polymer having a low vinyl bond content and a small coupling ratio, and therefore, the composition SV has excellent impact strength but poor gloss and heat stability of gloss.

As seen from the above results, the polystyrene composition of the present invention has well balanced impact resistance and gloss, and exhibits excellent heat stability of gloss.

INDUSTRIAL APPLICABILITY

A resin modified comprising as an effective ingredient a rubber composition of the present invention exhibits enhanced modifying effect on a resin. For example, a high-impact styrene resin composition made by modifying polystyrene resin with this resin modifier has well balanced impact resistance and gloss, and exhibits excellent heat stability of gloss.

What is claimed is:

1. A rubber composition comprising (A) 2% to 40% by weight of a conjugated diene polymer selected from a group consisting of (A1) a conjugated diene polymer having a vinyl bond content of at least 60% by weight based on the conjugated diene monomer units, and (A2) a conjugated diene polymer having a vinyl bond content of at least 30% by weight based on the conjugated diene monomer units and a coupling ratio of at least 75% by weight, and (b) 98% to 60% by weight of an aromatic vinyl-conjugated diene copolymer having an aromatic vinyl monomer unit content of 25% to 50% by weight and a blocked aromatic vinyl content of at least 50% by weight based on the aromatic vinyl monomer units.

2. The rubber composition according to claim 1, wherein the conjugated diene polymer (A) is the conjugated diene polymer (A1).

3. The rubber composition according to claim 1, wherein the conjugated diene polymer (A) is the conjugated diene polymer (A2).

4. The rubber composition according to claim 2, wherein the conjugated diene polymer (A1) has a conjugated diene monomer unit content of at least 55% by weight and a vinyl bond content of 65% to 85% by weight based on the conjugated diene monomer units.

5. The rubber composition according to claim 2, wherein the conjugated diene polymer (A1) has a viscosity of 10 to 200 cps as measured on a solution having a concentration of 5% by weight in styrene.

6. The rubber composition according to claim 1, wherein the conjugated diene monomer units in the aromatic vinyl-conjugated diene copolymer (B) has a vinyl bond content of at least 1% by weight, but lower than 30% by weight.

7. The rubber composition according to claim 5, wherein the conjugated diene monomer units in the aromatic vinyl-conjugated diene copolymer (B) has a vinyl bond content of at least 1% by weight, but lower than 30% by weight; and the aromatic vinyl-conjugated diene copolymer (B) has a viscosity of 10 to 200 cps as measured on a solution having a concentration of 5% by weight in styrene.

8. The rubber composition according to claim 3, wherein the conjugated diene polymer (A2) has a conjugated diene monomer unit content of at least 55% by weight and a vinyl bond content of 60% and 90% by weight.

9. The rubber composition according to claim 3, wherein the conjugated diene polymer (A2) has a coupling ratio of at least 80% by weight.

10. The rubber composition according to claim 2, wherein the conjugated diene polymer (A2) has a conjugated diene monomer unit contact of at least 75% by weight, a vinyl bond content of 60% to 90% by weight based on the conjugated diene monomer units, a coupling ratio of at least 80% by weight, and a viscosity of 10 to 200 cps as measured on a solution having a concentration of 5% by weight in styrene.

11. The rubber composition according to claim 10, wherein the aromatic vinyl-conjugated diene copolymer (B) has a vinyl bond content of at least 1% by weight based on the conjugated diene monomer units, but lower than 30% by weight; and the aromatic vinyl-conjugated diene copolymer (B) has a blocked aromatic vinyl content of at least 80% by weight and a viscosity of 10 to 200 cps as measured on a solution having a concentration of 5% by weight in styrene.

12. A resin modifier comprising as effective ingredients (A) 2% to 40% by weight of a conjugated diene polymer selected from the group consisting of (A1) a conjugated diene polymer having a vinyl bond content of at least 60% by weight based on the conjugated diene monomer units, and (A2) a conjugated diene polymer having a vinyl bond content of at least 30% by weight based on the conjugated diene monomer units and a coupling ratio of at least 75% by weight, and (B) 98% to 60% by weight of an aromatic vinyl-conjugated diene copolymer having an aromatic vinyl monomer unit content of 25% by 50% by weight and a blocked aromatic vinyl content of at least 50% by weight based on the aromatic vinyl monomer units.

13. A resin modified comprising as an effective ingredient the rubber composition as claimed in claim 1.

14. A resin composition comprising a resin and the resin modifier as claimed in claim 12.

15. The resin composition according to claim 14, wherein the resin is a thermoplastic resin.

16. The resin composition according to claim 15, wherein the thermoplastic resin is an aromatic vinyl resin.

* * * * *